(12) United States Patent
Devi

(10) Patent No.: US 7,764,573 B2
(45) Date of Patent: Jul. 27, 2010

(54) METHOD OF PROCESSING SEISMIC DATA AND METHOD OF PRODUCING A MINERAL HYDROCARBON FLUID AND A COMPUTER PROGRAM PRODUCT

(75) Inventor: Kattelmalvadi Ramaswamy Sandhya Devi, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 553 days.

(21) Appl. No.: 11/733,078

(22) Filed: Apr. 9, 2007

(65) Prior Publication Data

US 2007/0242564 A1 Oct. 18, 2007

Related U.S. Application Data

(60) Provisional application No. 60/791,066, filed on Apr. 11, 2006.

(51) Int. Cl.
*G01V 1/00* (2006.01)
(52) U.S. Cl. ........................................................ 367/38
(58) Field of Classification Search ............. 367/37–39; 702/9
See application file for complete search history.

(56) References Cited

U.S. PATENT DOCUMENTS 6,745,129 B1 6/2004 Li et al. ........................ 702/17

OTHER PUBLICATIONS

Li, "Singularity detection of the thin bed seismic signals with wavelet transform" ACTA Seismological Sinica, vol. 13, No. 1 (61-66), Jan. 2000.*

Li et al, Singularity detection of the thin bed seismic signals with wavelet transform, ACTA Seismologica Sinica, vol. 13 No. 1 (61-66), Jan. 2000.*

SEG expanded abstract 2004, by C Liner, C Li, F Gersztenkorn, and A Smythe "SPICE: A new general seismic attribute".

SEG expanded abstract 2004, by K R S Devi and A J Cohen "Wavelet transforms and hybrid neural nets for improved pore fluid prediction and reservoir properties estimation".

Malat and Zhong in IEEE Trans. On pattern analysis and Machine Intelligens, vol. 14, pp. 710-732 (1992).

MT Taner, F Koehler, and J Sheriff in Geophysics vol. 44, "Complex trace analysis" (1979).

Kristopher A. Innanen, "Local Signal Regularity as a Framework for Q-Estimation", SEG Int'l Exposition and $72^{nd}$ Annual Meeting, Oct. 6-11, 2002.

Oleg Portniaguine and John Castagna, "Inverse Spectral Decompositon", SEG Int'l Exposition and $74^{th}$ Annual Meeting, Oct. 10-15, 2004.

Avijit Chakraborty and David Okaya, Frequency-time Decomposition of Seismic Data using Wavelet-Based Methods, Geophysics, vol. 60, No. 6, pp. 1906-1916.

(Continued)

*Primary Examiner*—Scott A Hughes
*Assistant Examiner*—Krystine Breier

(57) ABSTRACT

A method of processing seismic data, wherein a digital seismic trace is provided comprising at least one seismic loop. A selected discrete wavelet transform of the digital seismic trace is obtained as a function of scale $s_j$ and shifted sample time $t_k$. From the discrete wavelet transform, a singularity spectrum is obtained for the at least one seismic loop, and a selected function is fitted to the singularity spectrum. Based on the fitted function, a reconstructed seismic trace may be calculated. The method may be embodied in the form of software code instructions in a computer program product.

21 Claims, 5 Drawing Sheets

OTHER PUBLICATIONS

J. Morlet, G. Arens, E. Fourgeau, and D. Giard, "Wave Propagation and Sampling Theory—Part 1" Complex signal and Scattering in Multilayered Media, Geophysics, vol. 47, No. 2, pp. 203-221.

Stephane Mallat and Wen Liang Hwang, Singularity Detection and Processing with Wavelets, IEEE Transactions on Information Theory, vol. 38, No. 2, Mar. 1992, pp. 617-643.

* cited by examiner

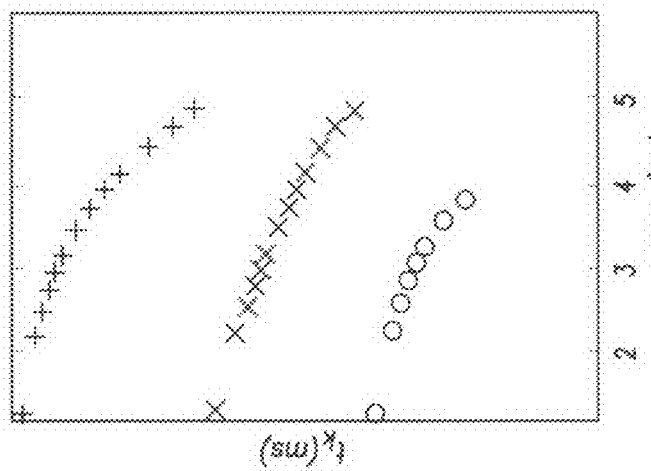
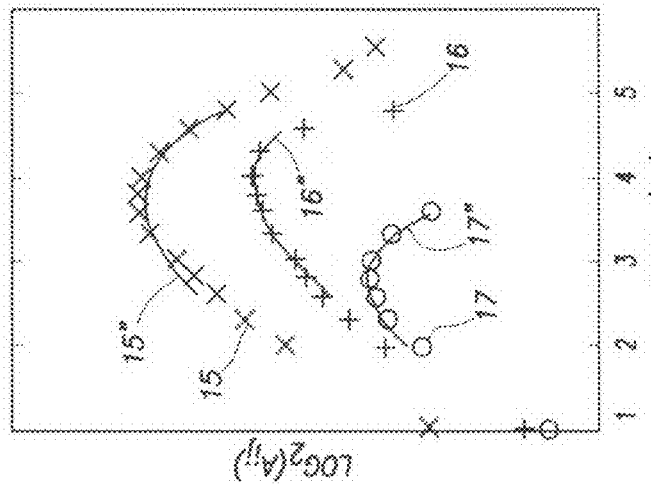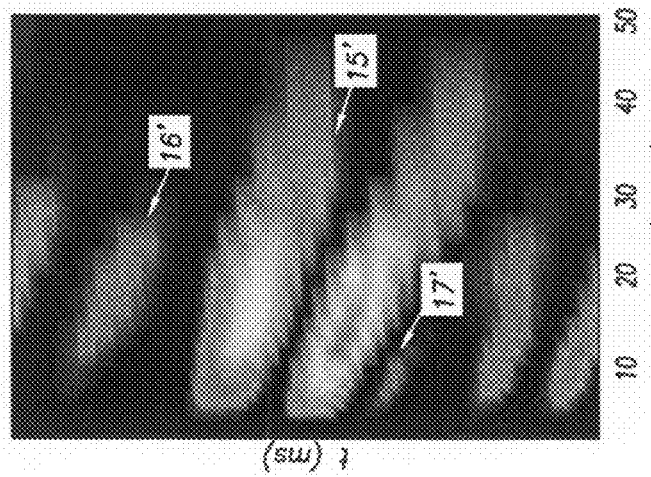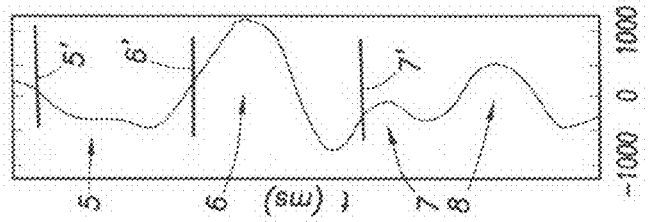

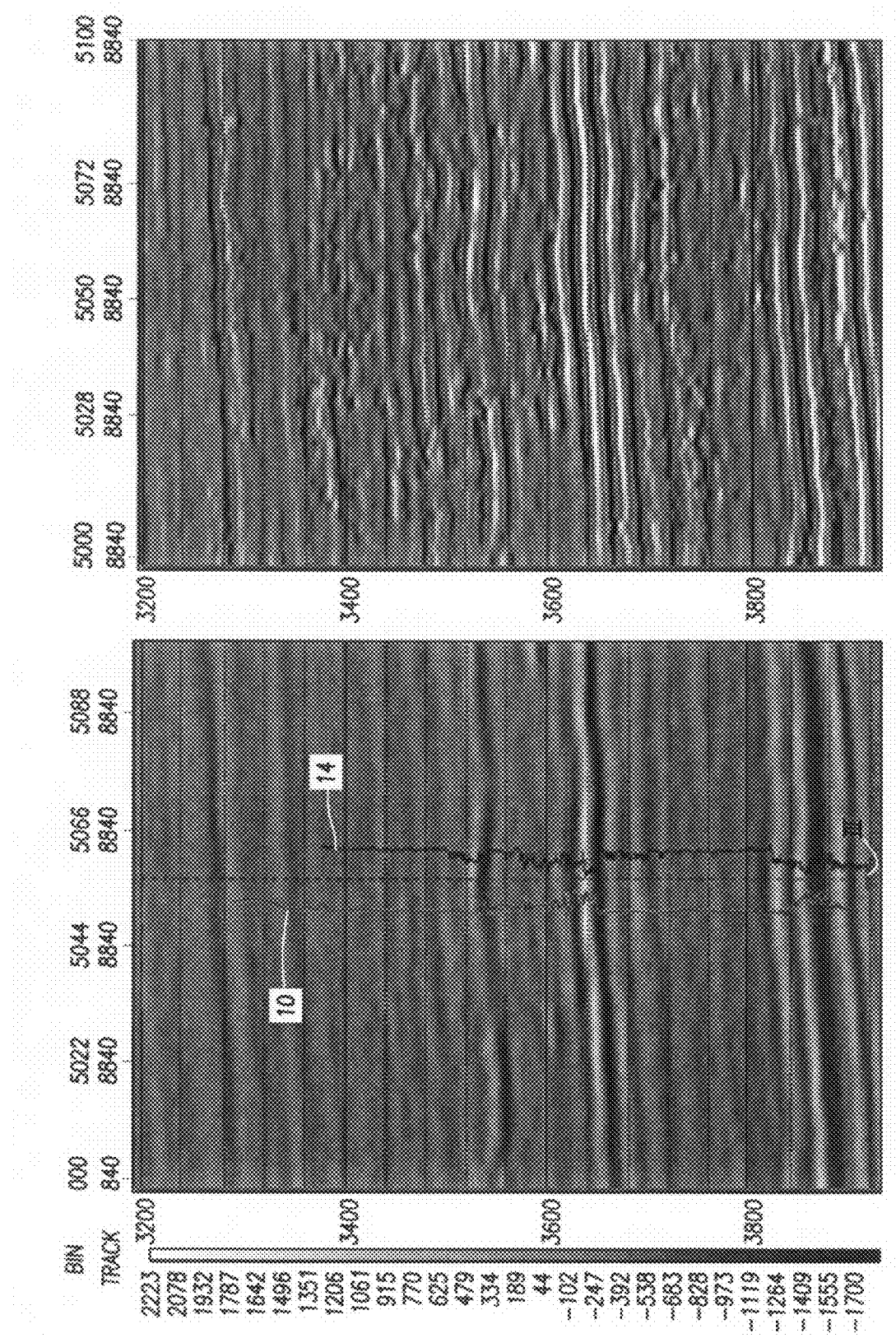

METHOD OF PROCESSING SEISMIC DATA AND METHOD OF PRODUCING A MINERAL HYDROCARBON FLUID AND A COMPUTER PROGRAM PRODUCT

CROSS REFERENCE TO EARLIER APPLICATION

The present application claims priority of U.S. provisional application No. 60/791,066, filed Apr. 11, 2006.

FIELD OF THE INVENTION

In a first aspect, the present invention relates to a method of processing seismic data. In another aspect, the present invention relates to a method of producing a mineral hydrocarbon fluid. In still another aspect, the present invention relates to a computer program product.

BACKGROUND OF THE INVENTION

U.S. Pat. No. 6,745,129 discloses a wavelet-based method for analysis of singularities, wherein a wavelet transform is applied to seismic trace data. A so-called Hölder exponent, sometimes also known as Lipshitz exponent, is calculated for every time point of the wavelet transform for each seismic trace. Calculated Hölder exponents are then plotted against time.

Said US Pat. '129 calculates the Hölder exponent as the slope of a line found by linear least squares regression analysis, on a log-log plot, of a set of data points that represent wavelet coefficient versus scale for each localized time point. However, the data points do in tact show non-linear structure. Thus, the Hölder exponent as calculated is influenced by contributions arising from non-linearly scaling aspects embedded in the data.

In order to reduce the standard deviation of a liner regression line, US Pat. '129 proposes to eliminate from the data the large and small scale and select a mid-range of scales to subject to linear regression analysis. However, even in the selected mid-range of scales the wavelet coefficients do not appear to follow a linear relationship against scale.

SUMMARY OF THE INVENTION

According to the first aspect of the invention, there is provided a method of processing seismic data, the method comprising the steps of:

(a) providing a digital seismic trace comprising at least one seismic loop;

(b) obtaining a selected discrete wavelet transform of the digital seismic trace, as a function of scale $s_j$ and shifted sample time $t_k$;

(c) obtaining a singularity spectrum from the discrete wavelet transform for said at least one seismic loop;

(d) fitting a selected function to the singularity spectrum, the selected function depending on three or more independent parameters of which at least one is a parameter associated with a seismic wavelet.

The method may further comprise the step: calculating a reconstructed seismic trace based on at least the other two independent parameters. These parameters may be controlled exclusively by earth properties whereby a contribution of the seismic wavelet is reduced.

The method of processing seismic data may be part of a method of analyzing an earth formation, wherein the seismic data has been obtained by activating a seismic source to induce seismic waves in the earth formation, and recording seismic responses from the earth formation.

In another aspect there is provided a method of producing a mineral hydrocarbon fluid from an earth formation, the method comprising steps of:

processing seismic data in accordance with the above to obtain processed seismic data;

using the processed seismic data to detect a reservoir in the earth formation, the reservoir containing a mineral hydrocarbon fluid;

producing the mineral hydrocarbon fluid from the reservoir via well bore that has been drilled to the reservoir.

Using the processed seismic data to detect a reservoir in the earth formation may comprise correlating the processed seismic data with the presence of a mineral hydrocarbon fluid-containing reservoir.

The processed seismic data may also be used to decide where to drill the well bore. This may comprise correlating the processed seismic data with the presence of faults and avoiding drilling the well bore through the fault.

In still another aspect, there is provided a computer program product comprising software code instructions for performing the above mentioned steps (b) to (d) on a digital seismic trace comprising at least one seismic loop, when the computer program product is run on a computer.

Such a computer program product may allow large amounts of seismic data to be processed.

The invention will be described hereinafter in more detail by way of example and with reference to the accompanying drawings.

BRIEF DESCRIPTION OF THE DRAWINGS

In the drawings:

FIG. 1a shows a seismic trace;

FIG. 1b shows a discrete wavelet transform of the seismic trace of FIG. 1a;

FIG. 1c shows singularity spectra obtained from the discrete wavelet transform of FIG. 1b for three events, and fit results;

FIG. 1d shows the corresponding phase spectra obtained from the discrete wavelet transform of FIG. 1b for the events;

FIG. 2a shows a grey-scale image of a seismic line,

FIG. 2b shows a grey-scale image of the seismic line of FIG. 2a after reconstruction;

In the Figures like reference numerals relate to like components

DETAILED DESCRIPTION

Figure 3B:
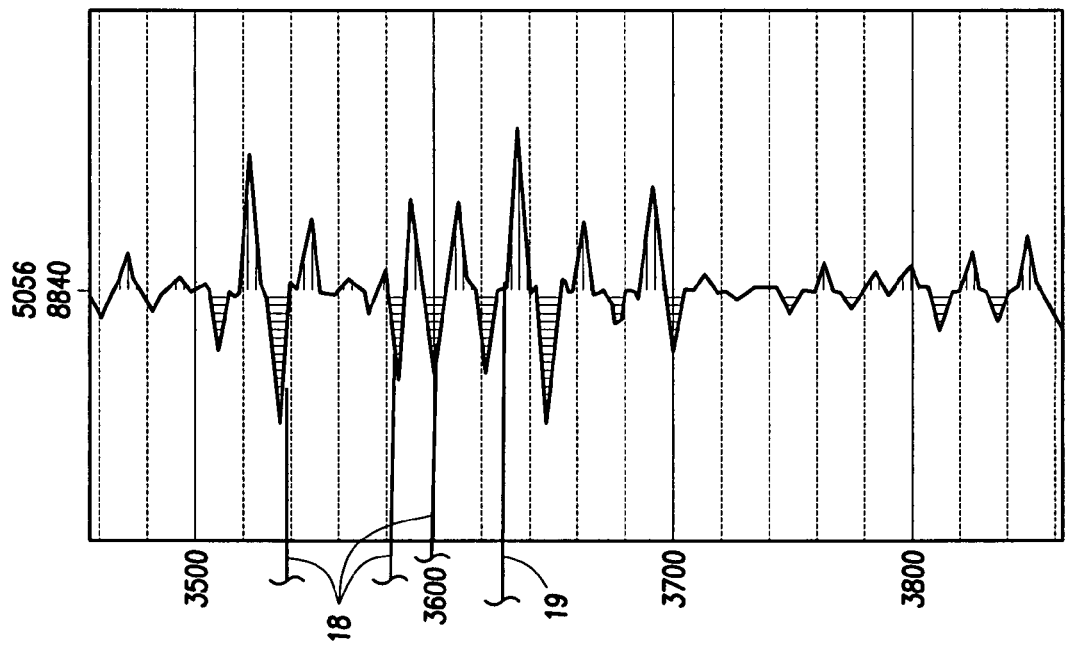
FIG. 3b shows the seismic trace along line III in FIG. 2a after reconstruction.

In the following, seismic data may be presented in the form of a so-called seismic volume. A seismic volume may correspond to a two dimensional array of so-called seismic traces, which may show seismic amplitude as a function of depth whereby depth may typically be represented as travel time.

A seismic line may correspond to a one-dimensional array of such seismic traces.

Seismic traces may be obtained by activating a seismic source thereby inducing seismic waves into an earth formation, and they contain information of the earth formation through which the seismic waves have propagated and from which the seismic waves have reflected.

A seismic loop is a term of art used to refer to part of an oscillation in a seismic trace. Each seismic loop has a positive and a negative gradient associated with it.

While singularity spectra of for instance well logs exhibit a power law behavior, it has been found that singularity spectra of seismic loops show a more complicated behavior caused at least in part by a seismic wavelet effect. The seismic wavelet effect is believed to manifest itself as a convolution of a signal corresponding to a pure, ideal, reflection off of an interface in the earth formation with a seismic wavelet.

FIG. 1a shows a seismic trace 1 represented as seismic amplitude S against time t, obtained from a layered earth formation. The seismic trace 1 comprises various seismic loops indicated at 5, 6, 7, and 8. These seismic loops comprise a reflection signal from an interface in an earth formation. The signal is believed to be convolved with a seismic wavelet.

The bandwidth of the seismic trace is between about 10 Hz and about 40 Hz, corresponding to about two octaves. This is typical for seismic data. The actual seismic data has a bandwidth limited to about two octaves, due to for instance, absorption effects in overburden layers in the earth formation. Raw seismic data is typically processed to remove noise, migration, and other artifacts before it is ready for interpretation for earth formation properties and potential hydrocarbon reservoir properties. The reduction in bandwidth due to all these effects combined may give rise to the seismic wavelet.

Typically, the seismic trace 1 is provided in the form of digital data, whereby the time t is sampled over $t_i$, i being a number corresponding to successive sample points in time space. Thus each number i corresponds to a time t. The seismic amplitude may thus be expressed as a function of time, S(t), or given as an amplitude at sample i, $S_i$. The data may be sampled at a frequency that is higher or even much higher than the bandwidth of the actual seismic trace.

A discrete wavelet transform, $D_{jk}$, of a digital signal $S_i$, as a function of scale $s_j$ and shifted sample time $t_k$, may be obtained by convolving $S_i$ with a discrete wavelet $\Omega_{jk}(i)$. In equation form, this may be given by equation (1):

$$D_{jk} = \Sigma_i S_i \cdot \Omega_{jk}(i), \quad (1)$$

wherein $\Sigma_i$ denotes summing over all i, and j is a number corresponding to successive points in a scale space comprising scale points $s_j$, and k is a number corresponding to sample points in a time space. Such a wavelet transform of a signal $S_i$ is sometimes also referred to as a decomposition of signal $S_i$. $\Omega_{jk}(i)$ are a set of discrete wavelets indexed by numbers j and k, and obtained by time-shifting a basic wavelet $\Omega(i)$ by an amount of $t_k$ and scaling by a factor of $s_j$. In short:

$$\Omega_{jk}(i) = \Omega((t_i - t_k)/s_j) \quad (2)$$

The value of the scale $s_j$ determines the resolution of the wavelet transform, whereby high scale value corresponds to low frequency components in the seismic data.

For a more detailed explanation, reference is made to an article by Stephane Mallat and Sifen Zhong, published in IEEE Transactions on pattern analysis and machine intelligence, volume 14 of July 1992, entitled "Characterisation of signals from multiscale edges". It is well known that wavelet transforms may be based on basic wavelets of various forms. Thus, the invention is not limited to one specific wavelet transform either. In the present embodiments, a wavelet has been chosen of which the shifted and scaled set forms a complete set. This allows recovery of the digital seismic trace via equation (3):

$$S_i = \Sigma_{jk} D_{jk} \cdot \overline{\Omega}_{jk}(i), \quad (3)$$

wherein $\overline{\Omega}_{jk}(i)$ is an associate matrix of $\Omega_{jk}(i)$. $\Sigma_{jk}$ denotes summing over all combinations of j and k.

FIG. 1b shows a discrete wavelet transform of the digital seismic trace 1 of FIG. 1a, as obtained using equation (1). The wavelet transform is presented in a so-called time/scale map, plotting j on the x-axis, k on the y-axis, and whereby the wavelet amplitude is represented by color-coding. (The color coding as shown has been printed in grey-scale.) Alternatively, the wavelet amplitude could be plotted against a z-axis, or as a contour plot.

The wavelet transform shows a landscape including local extrema (maxima and minima) that occur at interfaces in the earth formation, and originate from events at specific times in the seismic loops 5, 6, 7, 8 where the modulus of the gradient of the seismic trace has a maximum. Three of such events are indicated in FIG. 1a at 5', 6', and 7' as examples, and these events respectively correspond to the extrema 15', 16', and 17' in the wavelet transform. There are more extrema visible in the wavelet transform, and these correspond to unlabeled events that can be traced back to singularities in the seismic trace of FIG. 1a. The maximum gradients at marked events 5' and 6' are believed to correspond to top and bottom of a thick sand package, while the maximum gradient at 7' originates from the top of what is believed to be a thin sand package.

The selected basic wavelet employed to arrive at FIG. 1b, expressed in frequency ($\omega$) domain, was:

$$\Omega(\omega) = i\omega \cdot \left(\frac{\sin(\omega/4)}{(\omega/4)}\right)^{2n+2}, \quad (4)$$

wherein $\omega$ represents frequency, i represents an imaginary unit number defined as $i^2 = -1$, and n=1. In principle, n may be any natural number 0, 1, 2, etc., but it has been found that choosing n=2 or higher gives a wavelet with too many oscillations whereas n=0 gives a wavelet that does not fall off sufficiently fast. To use this wavelet to transform the digital seismic trace $S_i$ in time domain, it was numerically Fourier-transformed. Other wavelets may be selected instead of equation (4).

FIGS. 1c and 1d respectively show singularity spectra and phase spectra as obtained from the discrete wavelet transform of FIG. 1b. Referring first to FIG. 1c, the datapoints 15, represented by x-symbols, show a singularity spectrum associated with event 5'; the datapoints 16, represented by +-symbols, show a singularity spectrum associated with event 6'; and the datapoints 17, represented by o-symbols, show a singularity spectrum associated with event 7'. Such singularity spectra essentially plot a wavelet amplitude against scale, which wavelet amplitude at each plotted scale corresponds to the modulus of a local extremum (i.e. maximum or minimum). In the present FIG. 1c, the base-2 logarithm ($Log_2$) of the wavelet amplitude $A_{ij}$ has been plotted against the base-2 logarithm of the scale $s_j$.

It can be seen, in FIG. 1b, that, varying the scale, the local extrema in the wavelet transform do not occur at a constant shift time $t_k$. This gives rise to the phase spectra as shown in FIG. 1d, which expresses the relative time shifts $t_k$ against scale $s_j$. The same symbols are used as in FIG. 1c.

Essentially, the singularity spectra are found by following the local extrema along the times of constant phase. The singularity spectrum thus presents a phase-corrected instantaneous spectrum for selected times i. The combination of the singularity spectrum and phase spectrum contains sufficient information that unambiguously characterises the location of the local extrema in the wavelet transform and their amplitude in each point.

Singularity spectra are believed to be sensitive to lithology and pore fluid type. An advantage of considering singularity spectra is that it allows to unambiguously analyze wavelet transform amplitude in regardless of phase change effects. Inaccuracy that may be present in instantaneous spectra at a fixed sample time due to phase changes that occur as a function of frequency, may be reduced by fitting to singularity spectra. Singularity spectra essentially represent phase-corrected scale spectra. The singularity spectrum associated with each seismic event represents wavelet amplitude in terms of the modulus of a local extremum (i.e. maximum or minimum) against scale in the wavelet transformed data.

Applicant has further contemplated that each seismic loop may not represent an ideal reflection signal from an interface in an earth formation, but may be convolved with a seismic wavelet.

In absence of a seismic wavelet effect, the singularity spectrum would follow the scaling law as in equation (5):

$$A_{ij} = C_i \cdot (s_j)^{\alpha_i}, \quad (5)$$

wherein $C_i$ and $\alpha_i$ are seismic attributes governed by earth properties. Of these, $\alpha_i$ corresponds to the Hölder exponent, similar to the one calculated in U.S. Pat. No. 6,745,129.

On logarithmic scales, equation (5) corresponds to:

$$\text{Log}(A_{ij}) = \text{Log}(C_i) + \alpha_i \cdot \text{Log}(s_j), \quad (6)$$

which should correspond to a straight line in a Log-Log singularity spectrum plot such as FIG. 1c, with slope $\alpha_i$.

However, as can be seen, the singularity spectra in FIG. 1c do not behave according to a straight line. Therefore, extraction of parameters $C_i$ and $\alpha_i$ may be unstable and/or inaccurate.

It has been found that the non-linearity in the singularity spectra may be caused fully or in part by contributions from the seismic wavelet.

Such a seismic wavelet may often be described as a Ricker wavelet $W(\sigma)$ of width $\sigma$. A Ricker wavelet is a term of art, used to describe a zero-phase wavelet in the form of a second derivative of an error function which is a Gaussian function. See, for instance, Robert E Sheriff, Encyclopedic Dictionary of Exploration Geophysics, $3^{rd}$ edition, under lemma "Ricker Wavelet". Assuming such a Ricker wavelet, it has been derived that the singularity spectra (plotted logarithmically) obey a scaling law as set out in Equation (7):

$$\text{Log}(A_{ij}) = \text{Log}(C_i) + \text{Log}(s_j) + (\alpha_i - 1)/2 \cdot \text{Log}(s_j^2 + \sigma_i^2), \quad (7)$$

wherein $\sigma_i$ is the time-dependent width of the seismic wavelet. One of the possible reasons that the width is generally time dependent is that it depends on the amount of overburden. Thus, each seismic loop can be affected by a different value of $\sigma$.

The provided method thus may also reduce inaccuracy by selecting a function such as Equation (7), that depends on three or more independent parameters of which at least one is a parameter associated with a seismic wavelet, and fitting that function to the singularity spectrum.

By selecting the function to contain a parameter associated with the seismic wavelet in the singularity spectrum, the other two of the at least three parameters can be determined more accurately, since these parameters are then less dependent of any seismic wavelet effect.

At least two of the other independent parameters may be governed exclusively by earth properties, and thus more accurate information of these earth properties may be extracted employing the methods.

The lines in FIG. 1c show fits of Equation (7) to the singularity spectra, whereby line 15" is the fit result to spectrum 15, line 16" to spectrum 16, and line 17" to spectrum 17. The fits were obtained by fitting Equation (7) through the spectra, by linear regression, within a scale range corresponding to about the bandwidth of the original seismic trace. A surprisingly good match is achieved between the fitted spectra and the spectra derived from the wavelet transform.

The parameters $C_i$, $\alpha_i$, and $\sigma_i$ may thus be estimated at each seismic loop level.

The scaling parameters $C_i$ and $\alpha_i$, reflecting earth formation properties, are thus relatively accurately determined by separating them from a seismic wavelet contribution to the seismic data.

The fitting procedure may be done on singularity spectra plotted linearly, but it is simplified by employing the logarithmic plotting as in FIG. 1c.

Also, it is contemplated that there are many different wavelet families. The scaling law of Equation (7) may be generally applied using other types of wavelets as well, instead of the Ricker wavelet, including wavelets that are characterized by one or more other parameters in addition to their width. Examples of other wavelets include the Morlet wavelet, the Harr wavelet and the Daubechies wavelet. Those skilled in the art will appreciate that each wavelet has parameters that may be altered to stretch or compress the wavelet as desired. Those skilled in the art will also appreciate that these are only a few of existing wavelets that are suitable for use in the present invention. In addition, new wavelets suitable for use in the present methods may be created and employed in the methods. However, some wavelets may produce better results than others, for instance depending on the nature of the seismic trace data.

No well log data are needed to derive the wavelet. It is, however, expected that of the parameters associated with the selected seismic wavelet, the width $\sigma$ of the seismic wavelet will have a significant impact on the singularity spectra.

It is observed in FIGS. 1c and 1d that the singularity and phase spectra of every seismic loop do not necessarily continue all the way to the highest scale considered. It stops when the local extrema in the wavelet transform cannot be followed any further. In particular, thin packages such as the one associated with seismic loop 7, yields spectra that are shorter in scale than is the case for thick sands. The length is another useful attribute in estimating earth properties including hydrocarbon reservoir properties.

It is noted that for $s_j \ll \sigma$ it is increasingly difficult to unambiguously determine the three or more unknown independent parameters. It is also noted that for $s_j \gg \sigma$ the scaling law is believed to change, possibly as a result of contamination form the lithology of other horizons. Hence, it is believed that there is a limited range of scale values $s_j$ over which stable estimation of the three or more parameters can be made. The estimation of the three or more parameters is carried out over the scales that lie within the range available for the input seismic data bandwidth. Typically, seismic data has a bandwidth of approximately one octave on either side of the peak frequency, and consequently there are essentially only two octaves of scale values to work with.

Discrete wavelet transforms are often carried out employing a dyadic scaling space whereby $s_j=2^j$, wherein $s_j$ can assume the values 2, 4, 8, 16, etc. However, this may not always give a sufficient number of data points in the singularity spectra.

In order to determine the three or more independent scaling law parameters, the selected scale $s_j$ is preferably finer than dyadic. In order to maintain reasonable computational speed, scale space is formed by integer number values Examples include $s_j=j$ (j=1, 2, 3, successive natural numbers), and $s_j=2$, 4, 5, 6, 7, 8, 10, 12, 14, 16, 20, 24, 28, 32, for successive j values starting at 1. The latter has four integer numbers per dyadic scale point for $j \geq 2$, equally distributed between the dyadic scale point and the next dyadic scale point in sequence, while for the j=1 a dyadic value ($2^1=2$) is used to avoid fractions. The wavelet transform as given in FIG. 1b has been made using the latter scale space.

The scaling parameters $C_i$ and $\alpha_i$ are highly sensitive to lithology. Once the three or more parameters have been estimated (see above) by fitting within the range of scales available within the seismic bandwidth, the values of the at least two independent parameters that are controlled exclusively by earth properties may be exported to an operator as seismic attributes, and e.g. used to estimate reservoir properties. These parameters are expected to be sensitive to reservoir properties and scales that include what now have become sub-seismic scales because the seismic wavelet contribution has been separated from contributions governed by the earth formation. Amongst the properties the parameters are expected to reveal are variations of porosity within a sand package.

However, it is now proposed to use these earth-sensitive scaling parameters to calculate a reconstructed seismic trace whereby the contribution of the seismic wavelet is reduced or eliminated. Herewith, features in the data may become visible that were before overshadowed by the contribution of the seismic wavelet in the seismic trace. The reconstructed traces may be exported from the method to an operator, e.g. in the form of a reconstructed seismic line.

Reconstruction may be done as follows.

Singularity spectra may be recalculated assuming a scaling law that accepts the parameters as input but does not take into account seismic wavelet effects. In the case of the Ricker wavelet influenced scaling law of Equation (7), this may be done by setting $\sigma=0$. This will yield linear scaling behavior such as given in Equation (6). The singularity spectra may be recalculated even for scale values outside the seismic band width.

From the recalculated singularity spectra, and combining with the phase spectra, the extrema in the wavelet transform can be recalculated. Remaining points in the wavelet transform map then be interpolated, for instance by spline fitting through the extrema, and the thus reconstructed wavelet transform map can then be transformed back to obtain a reconstructed seismic signal trace using Equation (3).

An advantage is that the thus reconstructed seismic signal trace may have a higher bandwidth than the original because it has been cleared from, or corrected from, broadening effects that were introduced by seismic wavelet effects.

Moreover, the bandwidth may be increased by recalculating the singularity spectra and/or the wavelet transform for scale values outside the original range.

The bandwidth of the reconstructed seismic trace may exceed 50 Hz, or even 100 Hz. The bandwidth of the reconstructed seismic trace may exceed 2.5 octaves, preferably 3 octaves. In examples below, the bandwidth of the reconstructed trace even exceeded 3.5 octaves.

It has been found (see examples below) that the bandwidth can be increased by a factor of up to between about 3 and 4, using the present reconstruction method. Higher increases may be possible, too.

It may be desired, and often even necessary, to resample the original digital seismic trace to a higher sampling density in order to accommodate the additional information that is now obtained in the reconstructed seismic trace. Resampling the original digital seismic trace may comprise interpolating the original digital seismic trace to increase the sampling density. Typically, the sampling density may be increased by a factor corresponding to at least the expected relative increase in bandwidth. Typically suitable are in increase of the sampling density by a factor of 2, or 3 or more.

The methods above have been illustrated in accordance with analysis of seismic traces. However, they may also be applied to seismic lines or seismic volumes.

In case of a seismic line or a seismic volume, the wavelet transformation and subsequent steps may be applied to each of the plurality of digital seismic traces that form the seismic line or seismic volume. Alternatively, a multi-dimensional wavelet transform may be employed.

Example 1

To test the reconstruction method, a 10-50 Hz bandwidth seismic line, shown in FIG. 2a in grayscale representation of seismic amplitude, has been reconstructed. The earth formation to which this seismic line pertains corresponds to a complex channel-levee system which is normally quite hard to map from the relatively low resolution of the data. The result of the reconstruction is shown in FIG. 2b. The reconstructed bandwidth is 10-120 Hz, corresponding to 3.58 octave, and clearly a higher resolution is achieved showing not only improved continuity of the loops, but also revealing the complexity of the geology very well.

Figure 3A:
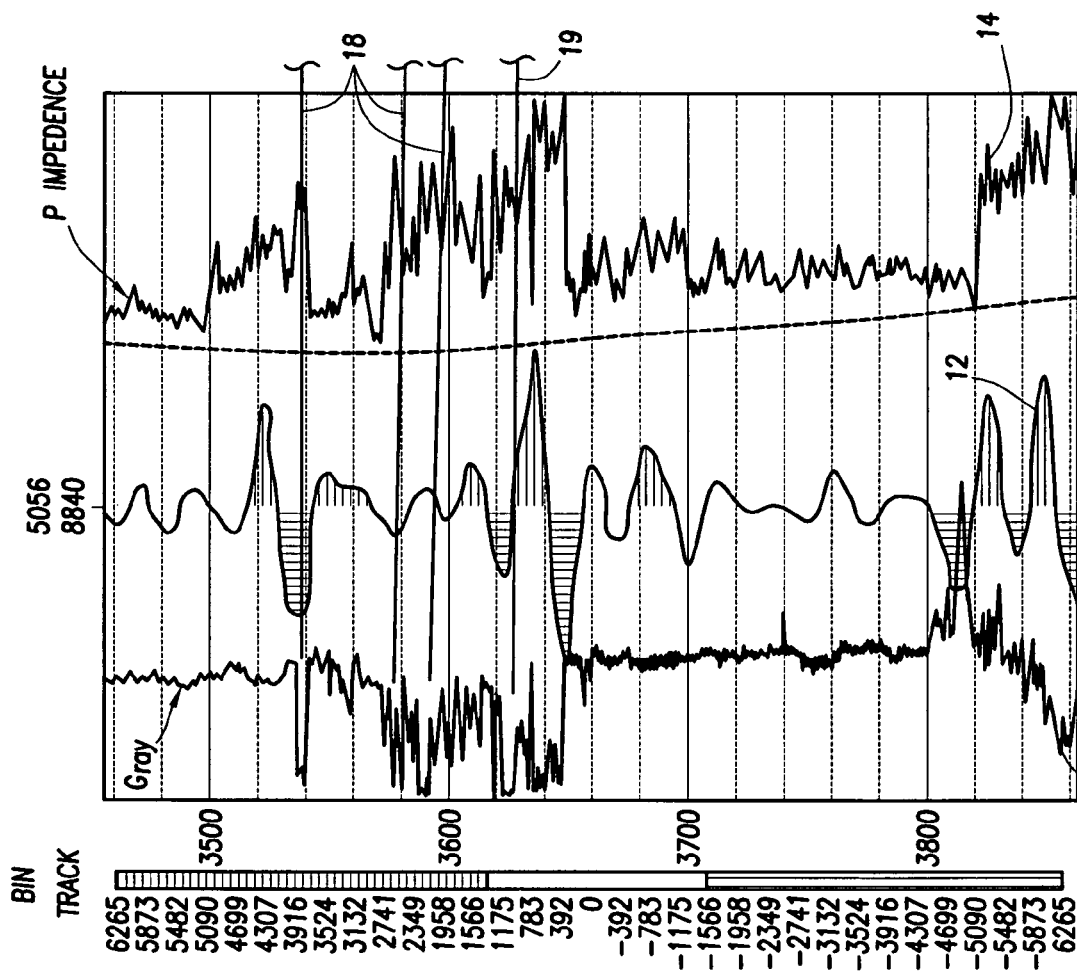
FIG. 3a shows well log data along line III in FIG. 2a along with the seismic trace.

Line III in FIG. 2a represents the location of an exploration well. Line 10 corresponds to a gamma-ray log taken in the well III, and line 14 corresponds to an impedance log. A better visible comparison of the high-resolution reconstructed seismic trace with the original low-resolution seismic trace and well log data is shown in FIGS. 3a and 3b.

FIG. 3a shows again the gamma ray log (line 10), the low-resolution seismic trace (line 12) and the impedance log (line 14). Both the gamma ray log 10 and the impedance log 14 show several sand packages of which some are highly laminated. Relatively soft sand packages are indicated by lines 18, and a relatively hard sand package is indicated by line 19. Only two prominent sands can be seen in the low resolution data 12. However, the high-resolution reconstructed seismic trace in FIG. 3b clearly shows several sands.

Example 2

Figure 4B:
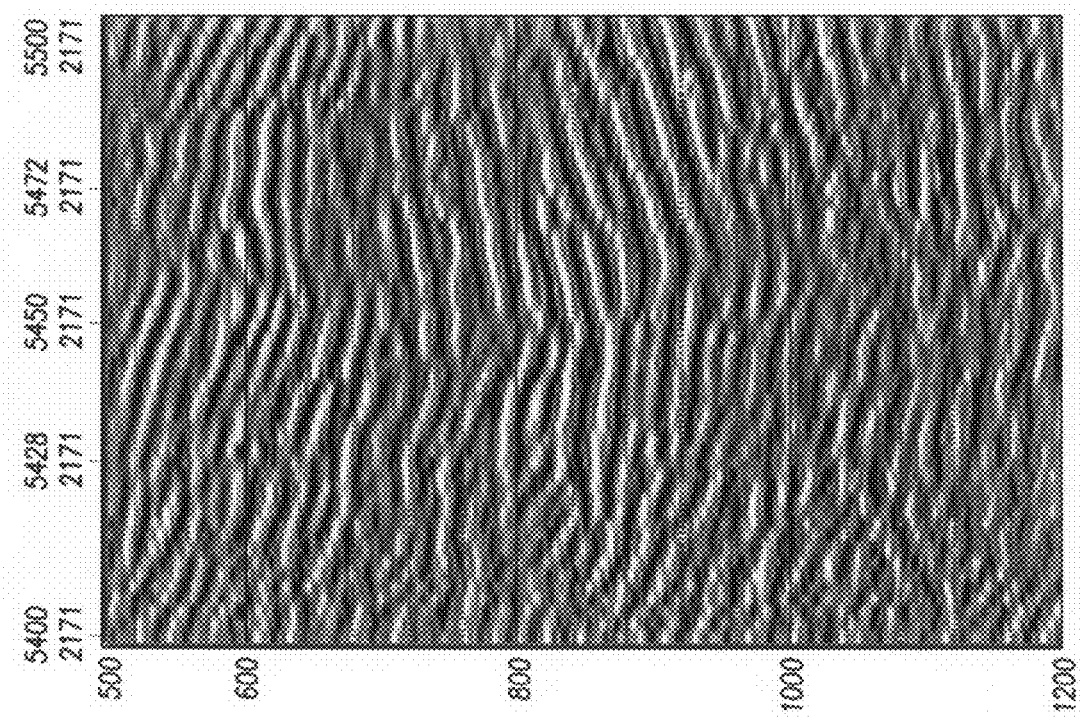
FIG. 4b shows a grey-scale image of the seismic line of FIG. 4a after reconstruction.
Figure 4A:
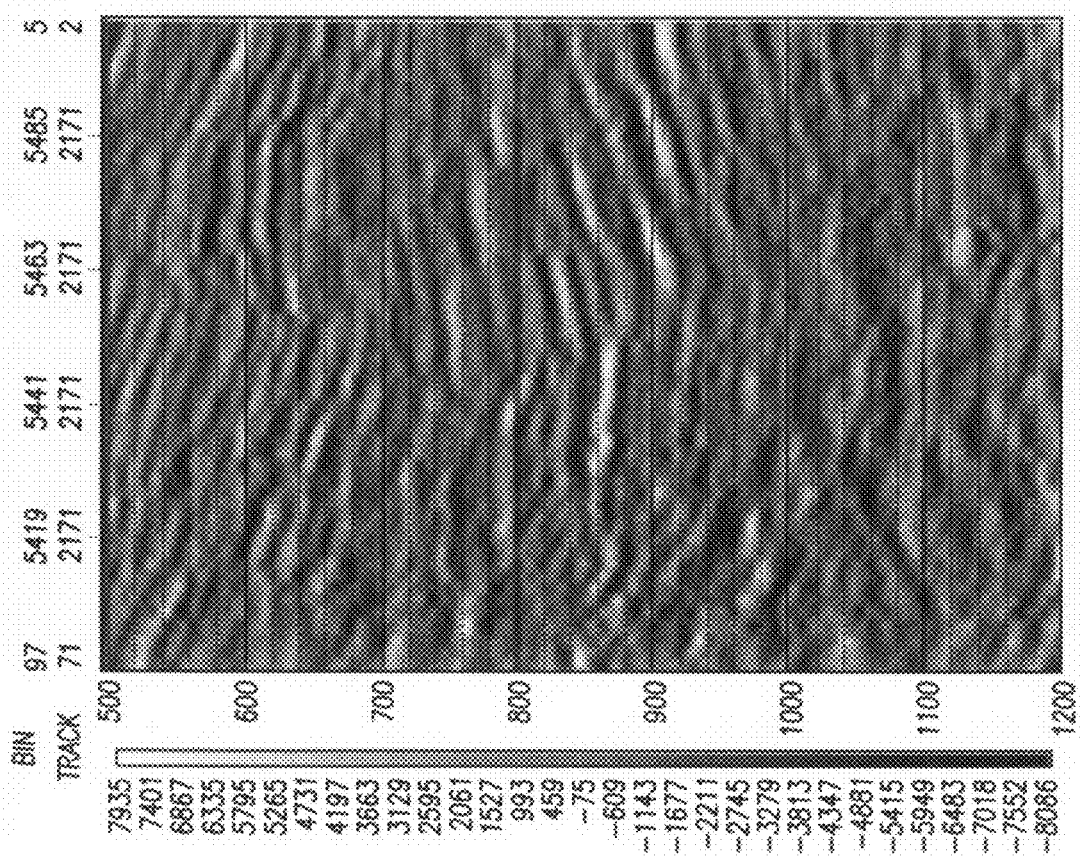
FIG. 4a shows a grey-scale image of a seismic line.

The usefulness of the high-resolution signal for better geological interpretation becomes more clear in the present example with reference to FIGS. 4a and 4b.

FIG. 4a shows an input seismic line with a seismic bandwidth of 10-40 Hz, while FIG. 4b shows the corresponding reconstructed 10-120 Hz high-resolution seismic line based on the input seismic line. The area in this example corresponds to a very heavily faulted region with stacked sands. Fault continuation and the event continuity is a big problem in analyzing FIG. 4a. It is noted that the faults can be seen much better in the reconstructed high resolution seismic line of FIG. 4b, and the stacked nature has been clearly brought out.

These examples show that stable singularity spectra can be extracted from digital wavelet transforms, even for sands which are below tuning thickness. Reconstructed high-resolution seismic data shows subtle geological features that are not obvious in the low resolution data. Hence, the present methods can better aid both the interpretation and estimation of hydrocarbon reservoir properties. Sub-seismic features may thus be mapped, including, but not limited to, small faults, fractures, fine-scale variations within channel margins and so on.

Summarizing, whereas the singularity spectra for, for instance well logs, may show a power scaling law, for seismic the scaling law needs modification due to seismic wavelet effects. A dynamic and stable estimation of both the earth-governed scaling parameters and wavelet parameters can be carried out within the bandwidth of the seismic data. Based on the estimated scaling parameters, the seismic data can be reconstructed at higher bandwidth.

The seismic processing as described above may be performed on a computer. A computer program product may comprise software code instructions for performing the steps of obtaining the discrete wavelet transform, the singularity spectrum, and the fitting with the scaling law function, when the computer program product is run on a computer. Optionally, the computer program product may also comprise software code instructions for seismic reconstruction. The computer program product may be provided in the form of a computer readable medium. Examples include: magnetic media such as a hard disc, a floppy disc, or magnetic tape; optical media such as optical disc, compact disc read only memory (CD-ROM), digital versatile disc (DVD); or electronic memory such as flash memory.

Such a computer program product would allow handling of large amounts of data. This, in turn, would be particularly advantageous for the interpretation, for instance during hydrocarbon exploration of a field, of geological features such as channel margins and fine scale variations within them, mapping of both seismic scale and sub-seismic scale faults and fractures and other features. It would also be advantageous for estimation of seismic and sub-seismic scale reservoir properties such as variations of porosities within a sand package, reservoir continuities, during exploration and/or development and/or reservoir surveillance during production.

Figure 5:
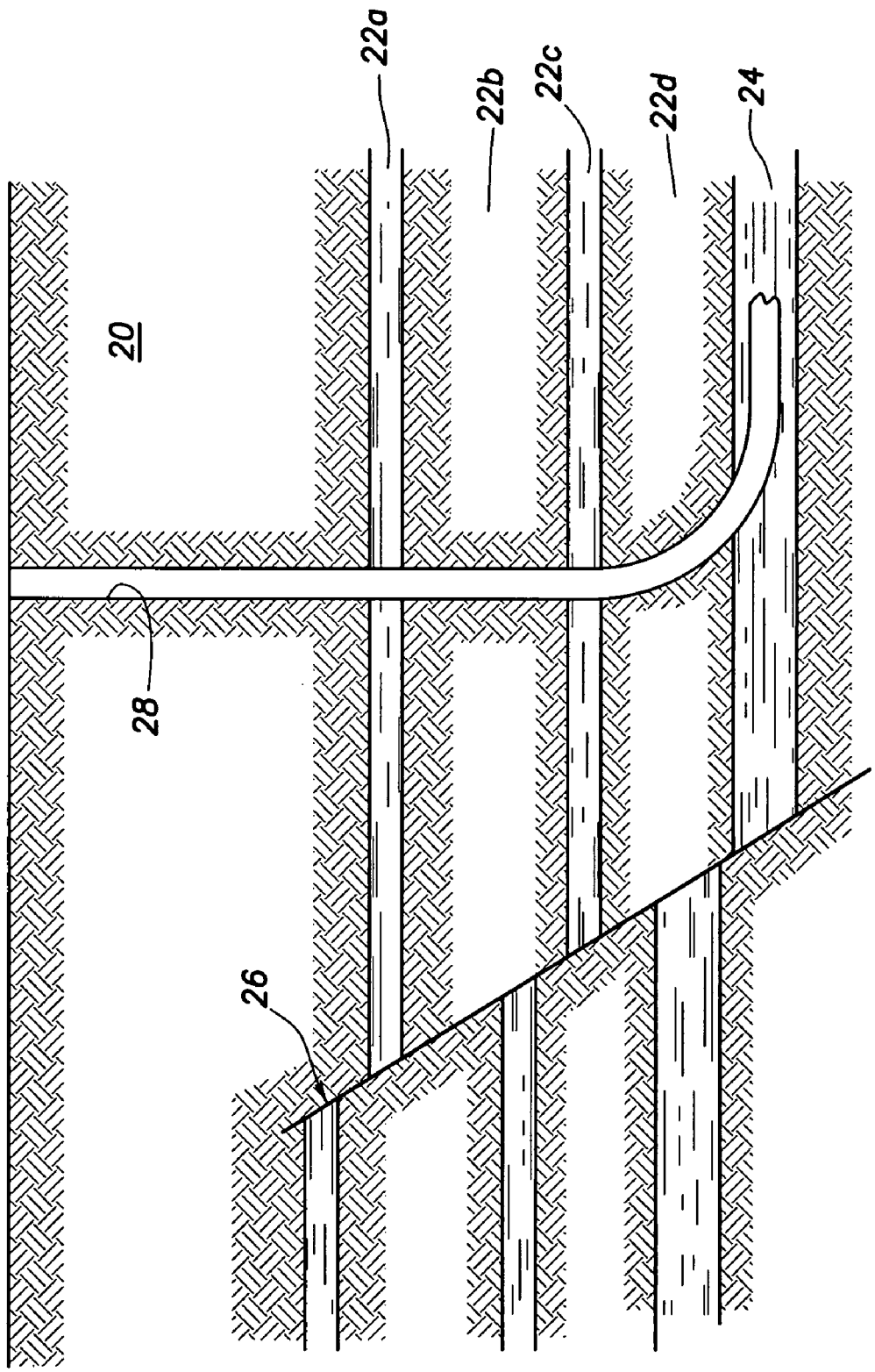
FIG. 5 schematically shows a cross section of an earth formation.

FIG. 5 schematically illustrates a method of producing a mineral hydrocarbon fluid from an earth formation 20. Such an earth formation may comprise various layers 22a to 22d, a reservoir 24 containing a mineral hydrocarbon fluid, and a fault line 26.

Seismic data processed in accordance with the above, may be used to detect the mineral hydrocarbon fluid-containing reservoir 24 in the earth formation 20, for instance by correlating the processed seismic data with the presence of a mineral hydrocarbon fluid containing reservoir. In addition, reservoir properties may be estimated or determined from the processed seismic data, as well.

In preferred embodiments, the seismic data processed in accordance with the above is used to decide where to drill the well bore and/or what is its preferred path or trajectory. For instance, one may want to stay clear from the fault 26 and stay clear from potential overpressure pressure zones. Instead of that, or in addition to that, it may be desirable to deviate from true vertical drilling and/or to steer into the reservoir 24 at the correct depth. The seismic data processed in accordance with the above may also be used for planning and drilling of such deviated wells.

All this information may be used while drilling a well bore 28. Once the well bore 28 extends into the reservoir 24 containing the mineral hydrocarbon fluid, the well bore 28 may be completed in any conventional way and the mineral hydrocarbon fluid may be produced via the well bore 28.

It is remarked that the use of the processed seismic data to decide where to drill the well bore, may be either direct or indirect. In the latter case, for instance, an exploration well may be drilled on the basis of the seismic data processed in accordance with the above while a separate well bore may be subsequently drilled for production of the hydrocarbon fluids. Logging data from the exploration well may be used instead of, or in addition to, the processed seismic data for planning and designing the subsequent well bore. This is indirect use.

I claim:

1. A method of increasing the resolution of an image produced from seismic data, the method comprising the steps of:
   (a) providing an input digital seismic trace comprising at least one seismic loop;
   (b) on a computer, obtaining a selected discrete wavelet transform of the first digital seismic trace, as a function of scale $s_j$ and shifted sample time $t_k$;
   (c) on a computer, obtaining a singularity spectrum from the discrete wavelet transform for each seismic loop;
   (d) on a computer, estimating from the singularity spectrum at least two subsurface scaling parameters that are controlled exclusively by earth properties and at least one parameter associated with a seismic wavelet;
   (e) on a computer, fitting to the singularity spectrum a selected analytic function that depends on said at least two subsurface scaling parameters and said parameter associated with a seismic wavelet
   (f) on a computer, removing the seismic wavelet parameter and using the subsurface scaling parameters to construct wavelet transforms at scales lower than that found in the input seismic trace;
   (g) on a computer, inverse transforming the wavelet transform constructed in step (f) to obtain a second seismic trace having a higher resolution than the input seismic trace.

2. The method of claim 1, wherein the parameter associated with the seismic wavelet comprises a width a of the seismic wavelet.

3. The method of claim 1, wherein step (a) comprises providing an original digital seismic trace and resampling the original digital seismic trace to a higher sampling density to obtain the input digital seismic trace.

4. The method of claim 3, wherein resampling comprises interpolating the original digital seismic trace to increase a sampling density.

5. The method of claim 3, wherein the sampling density is increased by a factor of 2 or more.

6. The method of claim 1, wherein the scale $s_j$ is finer than dyadic.

7. The method of claim 6, wherein the scale $s_j$ is formed by an integer number for each j.

8. The method of claim 1, wherein step (c) comprises obtaining a value of a local extreme in the wavelet transform at various values of $s_j$.

9. The method of claim 8, further comprising step
   (c1) obtaining a phase spectrum derived from values of $t_k$ at which the local extreme is found for the various values of $s_j$.

10. The method of claim 1, further comprising the steps:
    (h) providing plurality of digital seismic traces each comprising at least one seismic loop, the plurality of digital seismic traces forming a seismic line or seismic volume;

(i) repeating (b) to (g) for each of the plurality of digital seismic traces.

11. The method of claim 1, wherein the singularity spectrum associated with a selected seismic event represent the modulus of a local extremum of a wavelet amplitude in the wavelet transformed seismic trace.

12. The method of claim 1, wherein at least two of the independent parameters are controlled exclusively by earth properties, and step (g) includes
calculating a reconstructed seismic trace based on the at least two independent parameters that are controlled exclusively by earth properties whereby a contribution of the seismic wavelet is reduced.

13. The method of claim 12, wherein calculating the reconstructed seismic trace comprises the steps:
(g1) recalculating singularity spectra assuming absence of a contribution of the seismic wavelet;
(g2) combining singularity spectra with phase spectra to recalculate extrema in the wavelet transform;
(g3) performing a spline fit to the recalculated extrema to obtain a spline fitted recalculated wavelet transform;
(g4) inverse transforming the spline fitted recalculated wavelet transform against a congregate of the selected discrete wavelet transform matrix.

14. The method of claim 12, wherein the reconstructed seismic trace has a bandwidth that is higher than that of the provided digital seismic trace.

15. The method of claim 12, wherein the reconstructed seismic trace has a bandwidth exceeding 50 Hz.

16. The method of claim 12, wherein the reconstructed seismic trace has a bandwidth exceeding 2.5 octave.

17. A method of producing a mineral hydrocarbon fluid from an earth formation, the method comprising steps of:
processing seismic data in accordance with the method of claim 1 to obtain processed seismic data;
using the processed seismic data to detect a reservoir in the earth formation, the reservoir containing a mineral hydrocarbon fluid;
producing the mineral hydrocarbon fluid from the reservoir via a well bore that has been drilled into the reservoir.

18. The method of claim 17, wherein using the processed seismic data comprises correlating the processed seismic data with the presence of a mineral hydrocarbon fluid containing reservoir.

19. The method of claim 17, further comprising the steps of using the processed seismic data to decide where to drill the well bore and of drilling the well bore.

20. The method of claim 19, wherein using the processed seismic data further comprises correlating the processed seismic data with the presence of faults.

21. A computer program product comprising software code instructions for performing the steps (b) to (g) of claim 1, on a digital seismic trace comprising at least one seismic loop, when the computer program product is run on a computer.

* * * * *